United States Patent
Slotte et al.

(10) Patent No.: US 9,949,100 B2
(45) Date of Patent: *Apr. 17, 2018

(54) METHOD AND APPARATUS FOR FACILITATING REMOTE PARTICIPANCE IN A COMMUNITY

(75) Inventors: Sverre Slotte, Esbo (FI); Juha Johannes Salokannel, Tampere (FI); Lauri Heikki Laitinen, Espoo (FI); Jari Henrik Junell, Espoo (FI)

(73) Assignee: Nokia Technologies Oy, Espoo (FI)

( * ) Notice: Subject to any disclaimer, the term of this patent is extended or adjusted under 35 U.S.C. 154(b) by 122 days.

This patent is subject to a terminal disclaimer.

(21) Appl. No.: 14/374,912

(22) PCT Filed: Feb. 3, 2012

(86) PCT No.: PCT/IB2012/050518
§ 371 (c)(1),
(2), (4) Date: Aug. 26, 2014

(87) PCT Pub. No.: WO2013/114161
PCT Pub. Date: Aug. 8, 2013

(65) Prior Publication Data
US 2015/0003289 A1    Jan. 1, 2015

(51) Int. Cl.
*H04L 12/28*      (2006.01)
*H04W 4/20*      (2018.01)
(Continued)

(52) U.S. Cl.
CPC .......... *H04W 4/206* (2013.01); *H04W 4/008* (2013.01); *H04W 4/023* (2013.01); *H04W 64/00* (2013.01);
(Continued)

(58) Field of Classification Search
CPC ......... H04L 29/12009; H04L 29/12377; H04L 45/308; H04L 63/0428; H04W 4/008;
(Continued)

(56) References Cited

U.S. PATENT DOCUMENTS

| 7,418,268 B1 | 8/2008 | Cabano et al. |
| 7,532,607 B1 | 5/2009 | Eslambolchi et al. |

(Continued)

FOREIGN PATENT DOCUMENTS

| EP | 2178252 A1 | 4/2010 |
| KR | 2010-0128946 A | 12/2010 |

(Continued)

OTHER PUBLICATIONS

Non-Final Office action received for corresponding U.S. Appl. No. 14/346,489, dated Dec. 17, 2015, 28 pages.
(Continued)

*Primary Examiner* — Harun Chowdhury
(74) *Attorney, Agent, or Firm* — Alston & Bird LLP (57) ABSTRACT

A method and apparatus are provided for facilitating remote participance in a community. A method may include causing an anchor terminal located at a first location to use a proximity-based wireless communication technology to participate in an ad hoc community formed at least in part by the anchor terminal and one or more further terminals at the first location using the proximity-based wireless communication technology to communicate with each other. The method may further include causing the anchor terminal to maintain a connection to a structured network, thereby enabling a remote terminal to participate in the community. The method may additionally include, in an instance in which the remote terminal participates in the community, causing the anchor terminal to serve as a gateway between the terminals participating in the community at the first location and the remote terminal. A corresponding apparatus is also provided.

20 Claims, 5 Drawing Sheets

(51) Int. Cl.
*H04W 76/02* (2009.01)
*H04W 4/00* (2018.01)
*H04W 4/02* (2018.01)
*H04W 64/00* (2009.01)
*H04W 84/22* (2009.01)
*H04W 88/04* (2009.01)
*H04W 84/18* (2009.01)
*H04W 88/16* (2009.01)

(52) U.S. Cl.
CPC .......... *H04W 76/023* (2013.01); *H04W 84/18* (2013.01); *H04W 84/22* (2013.01); *H04W 88/04* (2013.01); *H04W 88/16* (2013.01)

(58) Field of Classification Search
CPC ....... H04W 4/023; H04W 4/206; H04W 8/26; H04W 52/367; H04W 64/00; H04W 48/04; H04W 76/023
USPC ....... 370/277, 312, 328, 338, 349, 392, 254; 455/41.2, 519
See application file for complete search history.

(56) References Cited

U.S. PATENT DOCUMENTS

| | | | |
|---|---|---|---|
| 7,739,339 | B2 | 6/2010 | Borys et al. |
| 7,917,145 | B2 | 3/2011 | Mahany et al. |
| 7,917,169 | B1 | 3/2011 | Hall |
| 8,254,301 | B2 | 8/2012 | Chen et al. |
| 8,327,178 | B2 | 12/2012 | Vandwalle et al. |
| 8,619,657 | B2 | 12/2013 | Das et al. |
| 8,688,161 | B2 | 4/2014 | Kies et al. |
| 8,706,146 | B2 | 4/2014 | Das et al. |
| 8,918,092 | B2 | 12/2014 | Rao |
| 2002/0105931 | A1* | 8/2002 | Heinonen ......... H04L 29/12009 370/338 |
| 2003/0186716 | A1 | 10/2003 | Dorenbosch et al. |
| 2004/0266439 | A1 | 12/2004 | Lynch, Jr. et al. |
| 2006/0194589 | A1 | 8/2006 | Sankisa |
| 2007/0004436 | A1 | 1/2007 | Stirbu |
| 2007/0109979 | A1 | 5/2007 | Fu et al. |
| 2007/0160016 | A1* | 7/2007 | Jain ..................... H04W 52/367 370/338 |
| 2007/0171910 | A1* | 7/2007 | Kumar ................ H04L 63/0428 370/392 |
| 2007/0173273 | A1 | 7/2007 | Gogic |
| 2007/0234432 | A1 | 10/2007 | Korkishko et al. |
| 2008/0085732 | A1* | 4/2008 | Mizuide ................ H04W 48/04 455/519 |
| 2008/0162495 | A1 | 7/2008 | Chu |
| 2008/0163355 | A1 | 7/2008 | Chu |
| 2008/0171567 | A1 | 7/2008 | Kossi et al. |
| 2008/0192666 | A1* | 8/2008 | Koskan ............. H04W 52/0261 370/311 |
| 2008/0279161 | A1 | 11/2008 | Stirbu et al. |
| 2009/0022092 | A1 | 1/2009 | MacInnis et al. |
| 2009/0022122 | A1 | 1/2009 | Quigley et al. |
| 2009/0092237 | A1 | 4/2009 | Chang et al. |
| 2009/0156167 | A1 | 6/2009 | Mooney |
| 2009/0232048 | A1 | 9/2009 | Lynch, Jr. et al. |
| 2009/0238087 | A1 | 9/2009 | Shikowitz et al. |
| 2009/0271519 | A1 | 10/2009 | Helvick |
| 2010/0020745 | A1 | 1/2010 | Agulnik et al. |
| 2010/0069035 | A1 | 3/2010 | Johnson |
| 2010/0202320 | A1 | 8/2010 | Bennett et al. |
| 2010/0208662 | A1 | 8/2010 | Fuste Vilella et al. |
| 2010/0250922 | A1 | 9/2010 | Bao et al. |
| 2010/0304759 | A1 | 12/2010 | Leppanen et al. |
| 2010/0306320 | A1 | 12/2010 | Leppanen et al. |
| 2011/0010458 | A1 | 1/2011 | Das et al. |
| 2011/0055309 | A1 | 3/2011 | Gibor et al. |
| 2011/0085475 | A1* | 4/2011 | Sinivaara ................ H04W 8/26 370/277 |
| 2011/0179272 | A1 | 7/2011 | Klos et al. |
| 2011/0196724 | A1 | 8/2011 | Fenton et al. |
| 2011/0210618 | A1 | 9/2011 | Takasu |
| 2011/0210816 | A1 | 9/2011 | Wang |
| 2011/0246845 | A1 | 10/2011 | Hannuksela et al. |
| 2011/0261753 | A1 | 10/2011 | Haddad |
| 2011/0317586 | A1 | 12/2011 | Palanki et al. |
| 2012/0134282 | A1 | 5/2012 | Tirronen et al. |
| 2012/0195296 | A1 | 8/2012 | Adachi et al. |
| 2012/0284328 | A1 | 11/2012 | Chung et al. |
| 2013/0034020 | A1 | 2/2013 | Morgan et al. |
| 2013/0331135 | A1 | 12/2013 | Novak et al. |
| 2015/0016364 | A1 | 1/2015 | Junell et al. |

FOREIGN PATENT DOCUMENTS

| | | |
|---|---|---|
| WO | 0143351 A2 | 6/2001 |
| WO | 2003/001825 A1 | 1/2003 |
| WO | 2006/113616 A1 | 10/2006 |
| WO | 2007/061573 A2 | 5/2007 |
| WO | 2007/117606 A2 | 10/2007 |
| WO | 2007142567 A1 | 12/2007 |
| WO | 2009/092843 A1 | 7/2009 |
| WO | 2009/133991 A1 | 11/2009 |
| WO | 2010/005752 A2 | 1/2010 |
| WO | 2013/041912 A1 | 3/2013 |

OTHER PUBLICATIONS

Zhang et al., "Mobile Learning With Bluetooth-Based E-learning System", 2nd International Conference on Mobile Technology, Applications and Systems, Nov. 15-17, 2005, 5 Pages.
Reiff, "Teaching Multiple Audiences From a Distance", IEEE International Professional Communication Conference Communication Jazz: Improvising the New International Communication Culture, 1999, pp. 219-224.
International Search Report and Written Opinion received for corresponding Patent Cooperation Treaty Application No. PCT/IB2011/054186, dated Jun. 7, 2012, 17 pages.
Kang et al., "Efficient Mobile Access to Internet Data Via a Wireless Peer-To-Peer Network", Proceedings of the Second IEEE Annual Conference on Pervasive Computing and Communications, Mar. 14-17, 2004, 9 Pages.
International Preliminary Report on Patentability for International Application No. PCT/IB2011/054186, dated Apr. 3, 2014, 13 Pages.
Extended European Search Report received for corresponding European Patent Application No. 11872765.0, dated Apr. 7, 2015, 8 pages.
Extended European Search Report received for corresponding European Patent Application No. 12867320.9, dated Sep. 4, 2015, 6 pages.
International Search Report received for corresponding Patent Cooperation Treaty Application No. PCT/IB2012/050518 dated Jan. 11, 2013, 5 pages.
Office Action for U.S. Appl. No. 14/346,489 dated Aug. 11, 2016.
Office Action for European Application No. EP 12 867 320.9 dated Sep. 6, 2016.
Office Action for European Application No. 12 867 320.9 dated Apr. 22, 2016.
International Preliminary Report on Patentability/Written Opinion for Application No. PCT/IB2012/050518 dated Aug. 5, 2014.
Office Action for Chinese Application No. 201180073639.7 dated Dec. 5, 2016.
Office Action for Chinese Application No. 201180073639.7 dated Mar. 3, 2017.
Office Action for U.S. Appl. No. 14/346,489 dated Mar. 10, 2017.
Office Action for European Application No. 11 872 765.0 dated Mar. 2, 2017.
Office Action for Chinese Application No. 201280068851.9 dated Jun. 7, 2017, 7 pages.
Office Action for Chinese Application No. 201180083639.7 dated Jul. 4, 2017, 9 pages.
Office Action for U.S. Appl. No. 14/346,489 dated Nov. 1, 2017.
Office Action for Chinese Application No. 201180073639.7 dated Oct. 10, 2017, 11 pages total.

* cited by examiner

METHOD AND APPARATUS FOR FACILITATING REMOTE PARTICIPANCE IN A COMMUNITY

RELATED APPLICATION

This application was originally filed as PCT Application No. PCT/IB2012/050518 filed on Feb. 3, 2012.

TECHNOLOGICAL FIELD

Example embodiments of the present invention relate generally to communications technology and, more particularly, relate to a method and apparatus for facilitating remote participance in a community.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer and providing convenience to users.

Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds. Consumers may accordingly use their mobile computing devices to access services and communicate with other devices over mobile networks at a variety of locations.

BRIEF SUMMARY

A system, method, and apparatus are herein provided for facilitating remote participance in a community. Systems, methods, and apparatuses in accordance with various embodiments may provide several advantages to computing devices, computing device users, service providers, and consumers. For example, some example embodiments provide an anchor terminal configured to serve as a gateway between one or more terminals participating in a community at a first location and a remote terminal via a structured network. The anchor terminal of some such embodiments may be configured to store a community identifier and associated membership information for the community, so as to enable a terminal to participate in the community.

In a first example embodiment, a method is provided, which may comprise causing an anchor terminal located at a first location to use a proximity-based wireless communication technology to participate in an ad hoc community formed at least in part by the anchor terminal and one or more further terminals at the first location using the proximity-based wireless communication technology to communicate with each other. The method of this example embodiment may further comprise causing the anchor terminal to maintain a connection to a structured network, thereby enabling a remote terminal located at a second location that is outside of range of the proximity-based wireless communication technology used by the terminals at the first location to participate in the ad hoc community by using an address associated with the anchor terminal to communicate with the anchor terminal over the structured network. The method of this example embodiment may additionally, in an instance in which the remote terminal participates in the community, comprise causing the anchor terminal to serve as a gateway between the terminals participating in the community at the first location and the remote terminal.

In a second example embodiment, an apparatus comprising at least one processor and at least one memory storing computer program code is provided. The at least one memory and stored computer program code may be configured, with the at least one processor, to cause the apparatus of this example embodiment to at least cause an anchor terminal located at a first location to use a proximity-based wireless communication technology to participate in an ad hoc community formed at least in part by the anchor terminal and one or more further terminals at the first location using the proximity-based wireless communication technology to communicate with each other. The at least one memory and stored computer program code may be configured, with the at least one processor, to further cause the apparatus of this example embodiment to cause the anchor terminal to maintain a connection to a structured network, thereby enabling a remote terminal located at a second location that is outside of range of the proximity-based wireless communication technology used by the terminals at the first location to participate in the ad hoc community by using an address associated with the anchor terminal to communicate with the anchor terminal over the structured network. The at least one memory and stored computer program code may be configured, with the at least one processor, to additionally cause the apparatus of this example embodiment, in an instance in which the remote terminal participates in the community, to cause the anchor terminal to serve as a gateway between the terminals participating in the community at the first location and the remote terminal.

In a third example embodiment, an apparatus is provided that may comprise means for causing an anchor terminal located at a first location to use a proximity-based wireless communication technology to participate in an ad hoc community formed at least in part by the anchor terminal and one or more further terminals at the first location using the proximity-based wireless communication technology to communicate with each other. The apparatus of this example embodiment may further comprise means for causing the anchor terminal to maintain a connection to a structured network, thereby enabling a remote terminal located at a second location that is outside of range of the proximity-based wireless communication technology used by the terminals at the first location to participate in the ad hoc community by using an address associated with the anchor terminal to communicate with the anchor terminal over the structured network. The apparatus of this example embodiment may additionally comprise means for, in an instance in which the remote terminal participates in the community, causing the anchor terminal to serve as a gateway between the terminals participating in the community at the first location and the remote terminal.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

Some example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from or send data to another computing device, it will be appreciated that the data may be received or sent directly from the another computing device or may be received or sent indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Examples of non-transitory computer-readable media include a floppy disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, a random access memory (RAM), a programmable read only memory (PROM), an erasable programmable read only memory (EPROM), a FLASH-EPROM, any other memory chip or cartridge, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Users having mobile computing devices within sufficient proximity of each other may establish ad hoc communities by which they may wirelessly exchange data and engage in various social activities. In this regard, the mobile computing devices may be configured to use a proximity-based communication technology, such as various radio frequency signaling technologies having a proximity-limited effective range (for example, Bluetooth, Wi-Fi signaling, various Institute of Electrical and Electronics Engineers 802.11 and/or 802.15 techniques, and/or the like), to establish an ad hoc local community when the devices are within sufficient proximity of each other to communicate via the proximity-based communication technology. However, the nature of these local communities may be temporary, as membership in the community may be dissolved when the user moves out of the requisite proximity to the other member(s) of the community. In this regard, a user having a computing device located at a location outside of range of the proximity-based communication technology used for communication between members of the local community may not be able to participate in the community. As such, some example embodiments facilitate remote participance in a community, such as a local ad hoc community formed at least in part by a plurality of terminals at a first location using a proximity-based wireless communication technology to communicate with each other.

Figure 1:
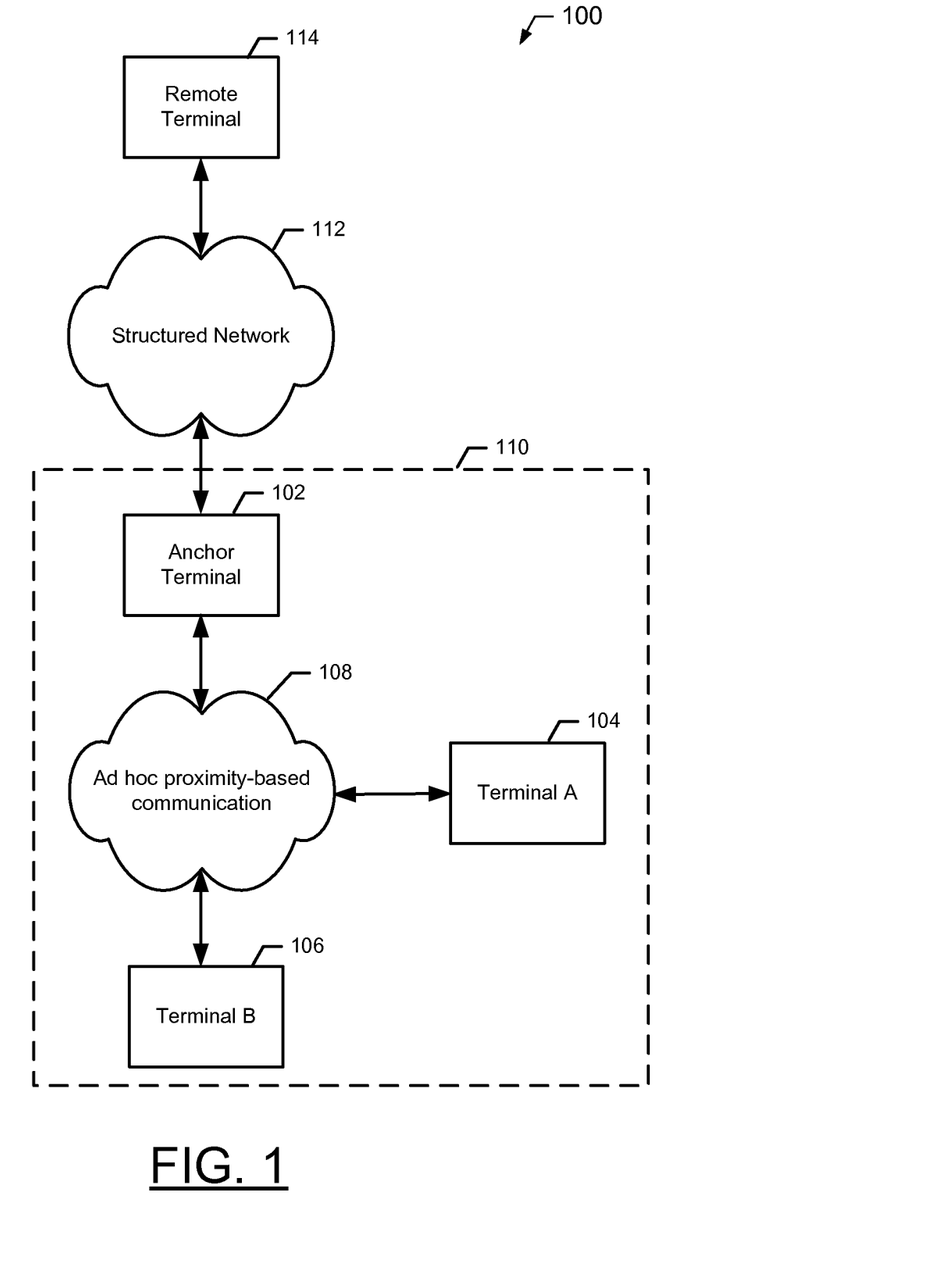
FIG. 1 illustrates a system for facilitating remote participance in a community according to some example embodiments.

FIG. 1 illustrates a diagram of a system 100 for facilitating remote participance in a community according to some example embodiments. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for facilitating remote participance in a community, numerous other configurations may also be used to implement embodiments of the present invention.

In some example embodiments, the system 100 may include a local ad hoc community 110. The community 110 may be formed at least in part by a plurality of computing devices at a location that are within sufficient proximity of each other to communicate using a proximity-based communication technology. For example, a community 110 may be formed by users having compatible computing devices at a sporting event or other gathering where there may be users within sufficient proximity of each other. Three computing devices, the anchor terminal 102, terminal A 104, and terminal B 106, are illustrated as being members of the community 110 in the system 100 by way of example. However, it will be appreciated that the community 100 and/or other such local communities that may be formed in accordance with various example embodiments may include any number of computing devices.

As illustrated in FIG. 1, the computing devices forming the community 110 (for example, the anchor terminal 102, terminal A 104, and terminal B 106) may communicate via ad hoc proximity-based communication 108. This proximity-based communication may comprise the computing devices forming an ad hoc mesh network and/or communicating via one or more wireless communication links using a proximity-based communication technology. Such proximity-based communications technology may comprise any wireless communications technology by which two or more computing devices may communicate when they are within a proximate range of each other (for example, within a communications or signaling range of the proximity-based communications technology). By way of non-limiting example, such proximity-based communications technology may comprise Bluetooth, a communications technique implementing any version of the Institute of Electrical and Electronics Engineers (IEEE) 802.15 standard, ZigBee, Ultra-Wideband, a near field communications technology, infrared, a wireless local area network (WLAN) communications technology, signaling using any version of the IEEE 802.11 standard, any wireless personal area networking (PAN) technology, or the like. In some example embodiments, the community 110 may be formed using ad hoc proximity-based communication in accordance with Nokia® Instant Community technology. In some example embodiments, the community 110 may comprise an Awarenet-based community.

One of the terminals forming the community 110 may be designated to serve as the anchor terminal. In the example of FIG. 1, the anchor terminal 102 is illustrated as serving as the anchor terminal. The anchor terminal 102 may be configured to maintain a connection to a structured network 112 so as to enable remote participance in the community. In this regard, as will be further described herein below, the anchor terminal 102 may be configured to enable a remote terminal(s), such as the remote terminal 114, that may be located at a location that is outside of range of the proximity-based wireless communication technology of the terminals locally participating in the community (for example, the anchor terminal 102, terminal A 104, and terminal B 106) to participate in the community. Accordingly, for example, a community may be formed by a group of friends attending a baseball game that possess the anchor terminal 102, the terminal A 104, and the terminal B 106. However, another friend that may use the remote terminal 114 may not be able to attend the game. Some example embodiments may accordingly facilitate remote participance in the community by the friend that is unable to attend the game. While only a single remote terminal 114 is illustrated in FIG. 1, it will be appreciated that this illustration is by way of example, and not by way of limitation. In this regard, some example embodiments may facilitate remote participance in a community by multiple remote terminals 114.

The structured network 112 may comprise any structured network. By way of non-limiting example, the structured network 112 may comprise one or more wireless networks (for example, a cellular network, a structured wireless local area network, wireless metropolitan area network, and/or the like), one or more wireline networks, or some combination thereof, and in some embodiments may comprise at least a portion of the internet. In this regard, the anchor terminal 102 may, in some example embodiments, be connected to the a cellular network, the internet, and/or other structured network while communicating with one or more other members of the community 110 via ad hoc proximity-based communication 108.

A computing device participating in the community 110, such as the anchor terminal 102, terminal A 104, terminal B 106, remote terminal 114, and/or the like may comprise any computing device configured to communicate with another computing device, such as through use of a proximity-based communication technology and/or via the structured network 112. By way of non-limiting example, such a computing device may be embodied as a computer, laptop computer, mobile terminal, mobile computer, mobile phone, mobile communication device, tablet computing device, game device, digital camera/camcorder, audio/video player, television device, radio receiver, digital video recorder, positioning device, wrist watch, portable digital assistant (PDA), a chipset, an apparatus comprising a chipset, any combination thereof, and/or the like.

Figure 2:
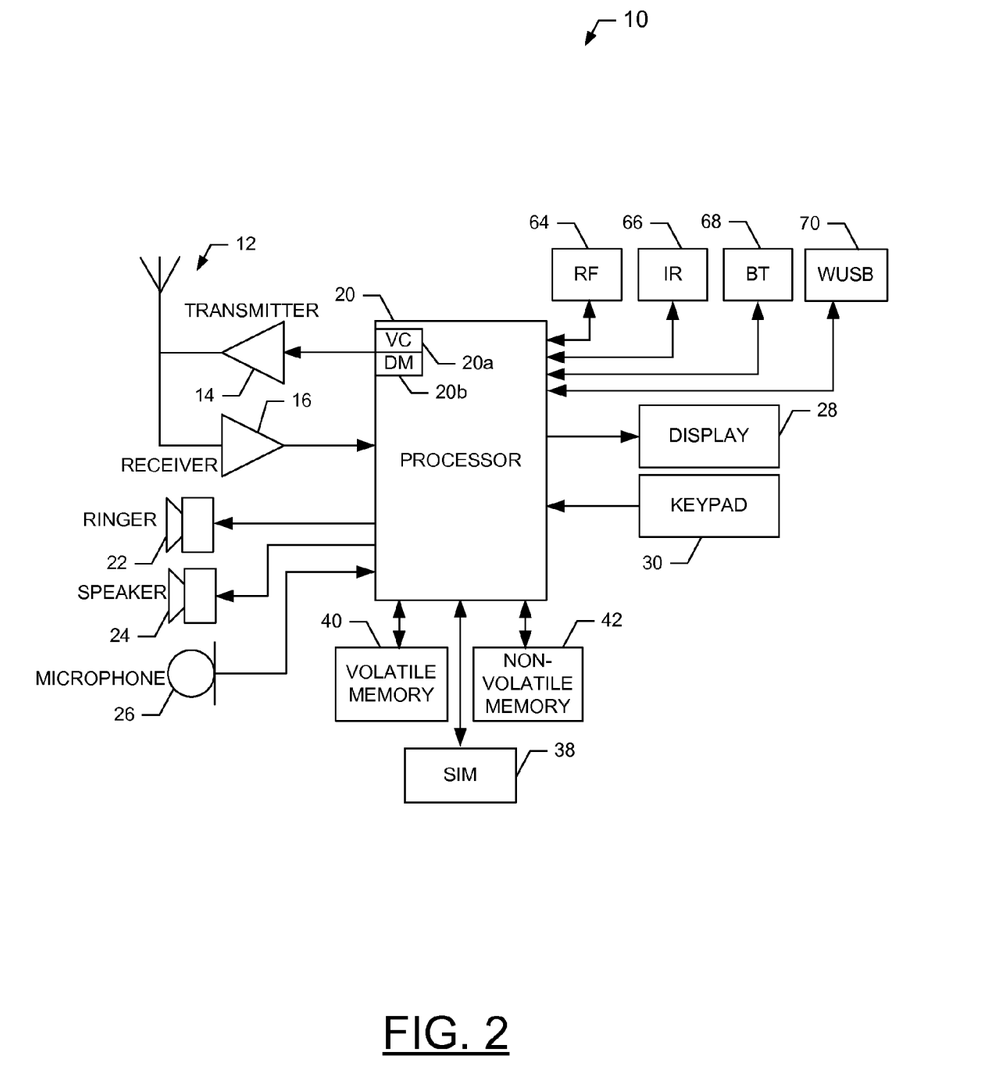
FIG. 2 is a schematic block diagram of a mobile terminal according to some example embodiments.

According to some example embodiments, a computing device configured to participate in the community 110 (for example, the terminal A102, terminal A 104, terminal B 106, remote terminal 114, and/or the like) may be embodied as a mobile terminal, such as that illustrated in FIG. 2. In this regard, FIG. 2 illustrates a block diagram of a mobile terminal 10 representative of some embodiments of a computing device configured to participate in the community 110 (for example, the terminal A102, terminal A 104, terminal B 106, remote terminal 114, and/or the like). It should be understood, however, that the mobile terminal 10 illustrated and hereinafter described is merely illustrative of one type of computing device that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). The mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display, a joystick, and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. The mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may comprise memory, such as a removable or non-removable subscriber identity module (SIM) 38, a soft SIM 38, a fixed SIM 38, a removable or non-removable universal subscriber identity module (USIM) 38, a soft USIM 38, a fixed USIM 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40, non-volatile memory 42 may also include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
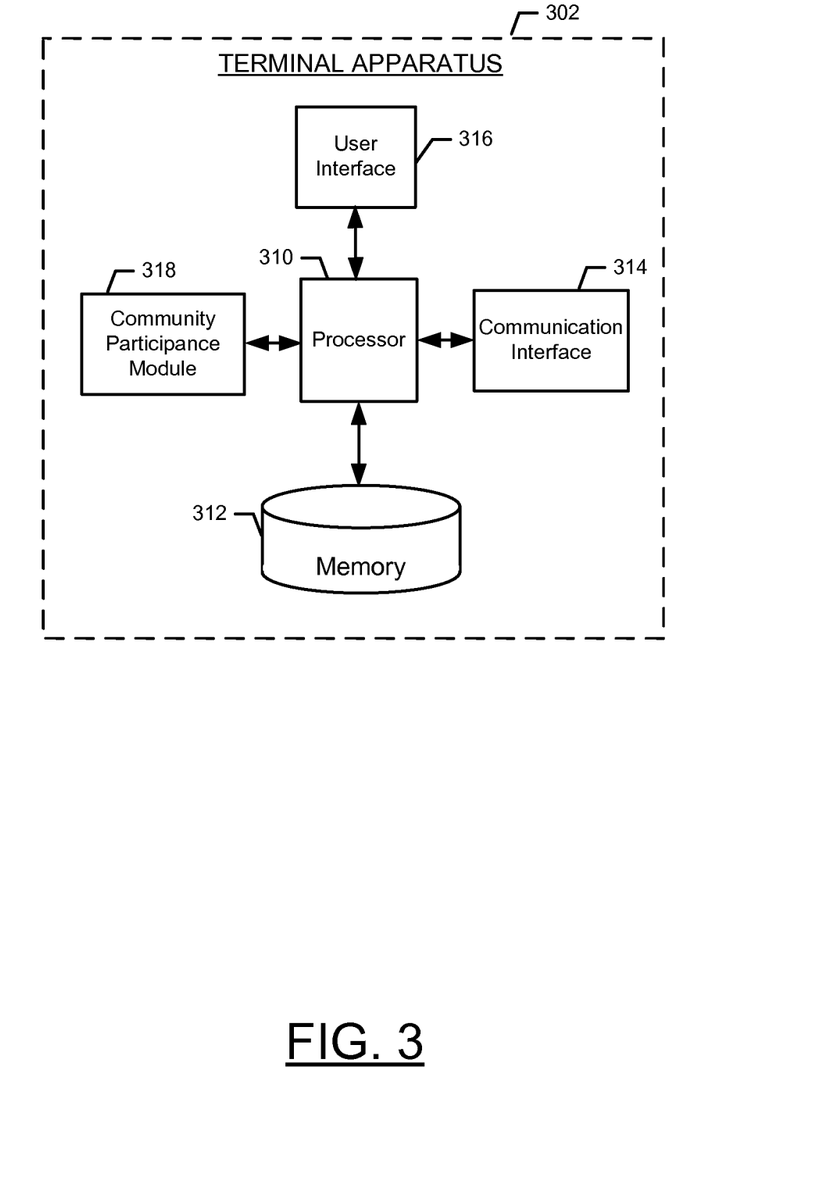
FIG. 3 illustrates a block diagram of a terminal apparatus according to some example embodiments.

Referring now to FIG. 3, FIG. 3 illustrates a block diagram of a terminal apparatus 302 according to some example embodiments. The terminal apparatus 302 may comprise an apparatus, which may be implemented on a computing device which may be configured to participate in a community, such as the community 110 in accordance with some example embodiments. Accordingly, the terminal apparatus 302 may be implemented on an anchor terminal 102, terminal A 104, terminal B 106, remote terminal 114, and/or the like in accordance with some example embodiments.

In some example embodiments, the terminal apparatus 302 may include various means for performing the various functions herein described. These means may comprise one or more of a processor 310, memory 312, communication interface 314, user interface 316, or community participance module 318. The means of the terminal apparatus 302 as described herein may be embodied as, for example, circuitry, hardware elements (for example, a suitably programmed processor, combinational logic circuit, and/or the like), a computer program product comprising a computer-readable medium (for example memory 312) storing computer-readable program instructions (for example, software or firmware) that are executable by a suitably configured processing device (for example, the processor 310), or some combination thereof.

In some example embodiments, one or more of the means illustrated in FIG. 3 may be embodied as a chip or chip set. In other words, the terminal apparatus 302 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 310, memory 312, communication interface 314, user interface 316, and/or community participance module 318 may be embodied as a chip or chip set. The terminal apparatus 302 may therefore, in some example embodiments, be configured to implement example embodiments of the present invention on a single chip or as a single "system on a chip." As another example, in some example embodiments, the terminal apparatus 302 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 310 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some example embodiments the processor 310 may comprise a plurality of processors. The plurality of processors may be in operative communication with each other and may be collectively configured to perform one or more functionalities of the terminal apparatus 302 as described herein. The plurality of processors may be embodied on a single computing device or distributed across a plurality of computing devices collectively configured to function as the terminal apparatus 302. In embodiments wherein the terminal apparatus 302 is embodied as a mobile terminal 10, the processor 310 may be embodied as or may comprise the processor 20. In some example embodiments, the processor 310 is configured to execute instructions stored in the memory 312 or otherwise accessible to the processor 310. These instructions, when executed by the processor 310, may cause the terminal apparatus 302 to perform one or more of the functionalities of the terminal apparatus 302 as described herein. As such, whether configured by hardware or software methods, or by a combination thereof, the processor 310 may comprise an entity capable of performing operations according to embodiments of the present invention while configured accordingly. Thus, for example, when the processor 310 is embodied as an ASIC, FPGA or the like, the processor 310 may comprise specifically configured hardware for conducting one or more operations described herein. Alternatively, as another example, when the processor 310 is embodied as an executor of instructions, such as may be stored in the memory 312, the instructions may specifically configure the processor 310 to perform one or more algorithms and operations described herein.

The memory 312 may comprise, for example, volatile memory, non-volatile memory, or some combination thereof. In this regard, the memory 312 may comprise a non-transitory computer-readable storage medium. Although illustrated in FIG. 3 as a single memory, the memory 312 may comprise a plurality of memories. The plurality of memories may be embodied on a single computing device or may be distributed across a plurality of computing devices collectively configured to function as the terminal apparatus 302. In various example embodiments, the memory 312 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the terminal apparatus 302 is embodied as a mobile terminal 10, the memory 312 may comprise the volatile memory 40 and/or the non-volatile memory 42. The memory 312 may be configured to store information, data, applications, instructions, or the like for enabling the terminal apparatus 302 to carry out various functions in accordance with various example embodiments. For example, in some example embodiments, the memory 312 may be configured to buffer input data for processing by the processor 310. Additionally or alternatively, the memory 312 may be configured to store program instructions for execution by the processor 310. The memory 312 may store information in the form of static and/or dynamic information. This stored information may be stored and/or used by the community participance module 318 during the course of performing its functionalities.

The communication interface 314 may be embodied as any device or means embodied in circuitry, hardware, a computer program product comprising a computer-readable medium (for example memory 312) storing computer-readable program instructions (for example, software or firmware) that are executable by a suitably configured processing device (for example, the processor 310), or a combination thereof that is configured to receive and/or transmit data from/to another computing device. According to some example embodiments, the communication interface 314 may be at least partially embodied as or otherwise controlled by the processor 310. In this regard, the communication interface 314 may be in communication with the processor 310, such as via a bus. The communication interface 314 may include, for example, an antenna, a transmitter, a receiver, a transceiver and/or supporting hardware or software for enabling communications with one or more computing devices. The communication interface 314 may be configured to receive and/or transmit data using any protocol that may be used for communications between computing devices. In this regard, the communication interface 314 may be configured to receive and/or transmit data using any protocol that may be used for transmission of data over a wireless network, wireline network, some combination thereof, or the like by which the terminal apparatus 302 and one or more computing devices or computing resources may be in communication. As an example, the communication interface 314 may be configured to support communication with another terminal apparatus 302 using a proximity-based communication technology. Accordingly, the communication interface 314 may be configured to facilitate establishment and participation in a local community, such as the community 110. As a further example, the communication interface 314 may be configured to enable communication between the terminal apparatus 302 and another computing device via the structured network 112. The communication interface 314 may additionally be in communication with the memory 312, user interface 316, and/or community participance module 318, such as via a bus(es).

The user interface 316 may be in communication with the processor 310 to receive an indication of a user input and/or to provide an audible, visual, mechanical, or other output to a user. As such, the user interface 316 may include, for example, a keyboard, a mouse, a joystick, a display, a touch screen display, a microphone, a speaker, and/or other input/output mechanisms. In embodiments wherein the user interface 316 comprises a touch screen display, the user interface 316 may additionally be configured to detect and/or receive an indication of a touch gesture or other input to the touch screen display. The user interface 316 may be in communication with the memory 312, communication interface 314, and/or community participance module 318, such as via a bus(es).

The community participance module 318 may be embodied as various means, such as circuitry, hardware, a computer program product comprising a computer-readable medium (for example memory 312) storing computer-readable program instructions (for example, software or firmware) that are executable by a suitably configured processing device (for example, the processor 310), or some combination thereof and, in some example embodiments, may be embodied as or otherwise controlled by the processor 310. In embodiments wherein the community participance module 318 is embodied separately from the processor 310, the community participance module 318 may be in communication with the processor 310. The community participance module 318 may further be in communication with one or more of the memory 312, communication interface 314, or user interface 316, such as via a bus(es).

The community participance module 318 associated with a terminal apparatus 302 may be configured to determine a presence of another computing device and/or an established community (for example, a community 110) within sufficient proximity of a proximity-based communication technology. For example, the community participance module 318 may be configured to determine a presence of another computing device and/or an established community by detecting and/or interpreting wireless signals and/or data that may be received via the communication interface 314 from a proximate device in accordance with a proximity-based communication technology. The community participance module 318 may be further configured to cause the terminal apparatus 302 to establish a community and/or join an existing community by communicating with one or more proximate computing devices using a proximity-based communication technology.

In this regard, using the example of FIG. 1 in some example embodiments wherein a terminal apparatus 302 is implemented on the anchor terminal 102, the community participance module 318 associated with the anchor terminal 102 may be configured to determine a presence of the terminal A 104, terminal B 106, and/or an existing established community including the terminal A 104 and terminal B 106 while within the location of the local community 110. The community participance module 318 associated with anchor terminal 102 may be further configured to cause the anchor terminal 102 to join and/or establish the community 110 at least in part by causing the anchor terminal 102 to communicate with the terminal A 104 and/or terminal B 106 using a proximity-based communication technology.

In some example embodiments, a terminal participating in the community may serve as the anchor terminal. In some example embodiments, the terminal forming the community may serve as the anchor terminal. As another example, in the event that an anchor terminal for the community has not yet been designated, a terminal may volunteer to serve as the anchor terminal. Additionally or alternatively, in some example embodiments, terminals locally participating in the community may collectively negotiate which terminal serves as the anchor terminal based on specified criteria. For example, selection of an anchor terminal may be based at least in part on a quality of a connection with the structured network 112 (for example, a terminal having an available and/or higher quality connection to the structured network 112 may be preferred over a terminal that does not have a connection to the structured network 112 or that has a low connection quality). As another example, in an instance in which one or more of the terminals participating in the local community 110 are battery powered, selection of an anchor terminal may be based at least in part on available battery resources. In this regard, for example, a terminal having the greatest available power reserves may be preferred to serve as the anchor terminal in some example embodiments. As another example, in some example embodiments, a terminal having at least a threshold amount of power reserves may be selected to serve as the anchor terminal.

The community participance module 318 that may be associated with a terminal serving as the anchor terminal for a community (for example, the anchor terminal 102) may be configured to cause the anchor terminal to maintain a connection to the structured network 112 so as to enable one or more remote terminals, such as the remote terminal 114, to participate in the community. In this regard, a remote terminal may use an address that may be associated with the anchor terminal 102 that may be used to send data to the anchor terminal over the structured network 112 to participate in the community. By way of example, the address that may be associated with the anchor terminal 102 may comprise a phone number, International Mobile Subscriber Identity (IMSI), an email address, an Internet Protocol (IP) address, a Domain Service Name (DSN), a SIP Universal Resource Identifier (URI), and/or any other address that may be used to communicate with the anchor terminal 102 over the structured network 112.

As such, in an instance in which a remote terminal, such as the remote terminal 114, participates in the community, the community participance module 318 may be configured to cause the anchor terminal 102 to serve as a gateway between the terminals participating in the community at the first location (for example, the terminal A 104 and terminal B 106) and the remote terminal. Accordingly, the remote terminal 114 may send data to the community via the structured network 112 using an address associated with the anchor terminal 102. The community participance module 318 that may be associated with the anchor terminal 102 may be configured to receive the data sent by the remote terminal 114, and may be configured to cause the received data to be forwarded to one or more terminals participating in the community at the location of the anchor terminal 102 (for example, the terminal A 104 and/or terminal B 106) via proximity-based communication. The community participance module 318 that may be associated with the anchor terminal 102 may be further configured to cause data exchanged between terminals participating in the community at the location of the anchor terminal (for example, data exchanged between the anchor terminal 102, terminal A 104, and/or terminal B 106) to be forwarded toward the remote terminal 114 via the structured network 112.

In some example embodiments, a community may be identified by a community identifier for the community. The community identifier may, for example, comprise an alphabetic identifier, numeric identifier, alphanumeric identifier, an address, and/or other identifier by which a particular community may be identified and distinguished from other communities. The community identifier may be usable to enable terminals, such as the remote terminal 114 to participate in the community by sending data to other members of the community. In this regard, data sent to the community by a participant in the community may be flagged or otherwise sent in association with the community identifier to indicate that the data is to be sent to the community. Thus, for example, data sent to the community by the remote terminal 114 may be flagged with the community identifier such that the community participance module 318 that may be associated with the anchor terminal 102 may recognize that the data received from the remote terminal 114 is intended for the community and may forward it to the terminal A 104, terminal B 106, and/or other participant(s) in the community.

In some example embodiments, the community identifier may be automatically selected by the anchor terminal 102, and may be provided to other terminals participating in the community. Additionally or alternatively, in some example embodiments, one or more participants participating in the community may select an identifier for the community and communicate the selected identifier to the other terminals participating in the community. As still a further example, the community identifier may be randomly generated by a community participance module 318 that may be associated with a terminal participating in the community.

In some example embodiments, the community participance module 318 that may be associated with a terminal participating in the community may be configured to maintain membership information for the community. The maintained membership information may, for example, be stored in memory 312. The maintained membership information may, for example, comprise membership information comprise contact information associated with one or more members of the community. In this regard, the contact information may comprise information enabling the participating members to be contacted such that data may be communicated to members of the community. As such, the contact information may comprise any address, identifier, and/or the like associated with a terminal participating in the community that enables information to be sent to a terminal participating in the community and/or to a user associated with a participating terminal. By way of example, the contact information may comprise a phone number, International Mobile Subscriber Identity (IMSI) associated with a participating terminal, an email address associated with a participating user, an Internet Protocol (IP) address associated with a participating terminal, a Domain Service Name (DSN) associated with a participating terminal, a SIP Universal Resource Identifier (URI), and/or the like.

Membership information maintained by a terminal may be stored in association with the community identifier. In this regard, the community identifier may distinguish membership information for the community from membership information that may be stored for one or more other communities of which the terminal may be a member.

In some example embodiments, a user may specify a preferred or prohibited contact method for data exchanged within a community in which the user is participating. Accordingly, in some example embodiments, the type of contact information stored and/or used by a community participance module 318 to facilitate exchanging data with other members of the community may be selected in accordance with user preferences.

In some example embodiments, membership information may be maintained by the anchor terminal. In such example embodiments, the community participance module 318 that may be associated with the anchor terminal may collect membership information from other members of the community. The community participance module 318 that may be associated with the anchor terminal may be configured to use the stored membership information to facilitate serving as a gateway between the terminals participating in the community at the location of the anchor terminal and the remote terminal 114. In this regard, for example, contact information for the remote terminal 114 may be used to send data exchanged between members of the community to the remoter terminal 114 over the structured network 112.

In some example embodiments, contact information (for example, an address) for contacting the anchor terminal over the structured network 112 may be distributed to participants in the community. This contact information may be used by remote terminals, such as the remote terminal 114 to participate in the community. Additionally, as will be described further herein below, the contact information for the anchor terminal may be used by a terminal to continue to participate in the community after the terminal has left the location at which the community was formed. In some example embodiments, the contact information of anchor terminal may be secured such that a user that is a member of the community may not be able to view the contact information. In this regard, the contact information may be secured such that the community participance module 118 associated with a terminal may have access to the contact information for the anchor terminal, but a user of the terminal may not be able to directly view the contact information.

In some example embodiments, communities may be established as private communities or public communities. For example, a private community may be established between members of a group of people who know each other. In some such example embodiments, new (non-anonymous) participants in a private community may be approved by the community establisher/anchor terminal. The identity of the new joining participants may be automatically sent to all other participants.

A public community may be open to participation without a new participant having to be approved prior to joining the community, and thus may include members who do not know each other. A public community may be anonymous such that a user may not see the identity of other participants in the community. In embodiments wherein a public community is anonymous, the community participance module 318 associated with a terminal participating in the community may be configured to prevent a user of the terminal from seeing the identities of individuals that have joined the group. However, the number of participants and/or other non-sensitive information may be visible for the user. Alternatively, a public community may be non-anonymous such that users participating in the community may see identity information for other members of the community. As still a further alternative, in some example embodiments, identity information for members of a public community may only be visible to a user of the anchor terminal. In some example embodiments contact information and/or other identity information for members of the community may be provided in an open format only to trusted individuals, such as a member's friends on a social network, a member's email contacts, and/or the like.

In some example embodiments, data having larger file sizes may not be directly exchanged between members of the community. Instead, a larger file may be saved to a network-accessible hosting site, and a link to the file may be distributed to other members of the community. In this regard, for example, rather than communicating an image or video file to members of the community (for example, via ad hoc proximity-based communication 108 and/or over the structured network 112), the image or video file may be saved to a hosting site and a link enabling the image or video file to be accessed from the hosting site may be distributed to members of the community. Accordingly, in such example embodiments, data associated with a file size satisfying a threshold size (for example, a file exceeding a certain file limit) and/or a file having a certain type may not be directly exchanged between members of the community, but rather a link to a network-accessible file containing the data may be exchanged between members of the community.

In some example embodiments, data exchanged between participants in the community may be archived or otherwise saved on one or more participating terminals. In some such example embodiments, the anchor terminal may be responsible for saving all data exchanged between participants in the community. Alternatively, in some such example embodiments, the responsibility for storing data distributed in the community may be shared by multiple terminals participating in the community so as to relax the memory consumption burden on the anchor terminal. As still a further example, each terminal participating in the community may optionally save data that is exchanged between participants in the community.

In some example embodiments, wherein data exchanged between participants in the community is archived, the archived data may serve as a log of communication in a community. In some such example embodiments, users may access the log from the terminal(s) on which the log is saved, such as via the structured network 112 and/or via proximity-based communication. Additionally or alternatively, in some example embodiments, rather than remotely accessing the log, a user may request a terminal(s) on which the log is saved to send the log to his or her computing device, such as by email, a file transfer protocol transfer, and/or other method for transferring a file between computing devices. In some example embodiments, access to a log of community communications may be available to members of the community. Additionally or alternatively, in some example embodiments, access to a log of community communications may be controlled through access permissions such that a subset of members of the community may be granted access to the log, one or more individuals who are not members of the community may be granted access to the log, and/or the like.

In some instances, the anchor terminal 102 may leave the location at which the community was formed while one or more terminals (for example, the terminal A 104 and terminal B 106) may remain at the location. In such a situation, the role of anchor terminal may be transferred to another terminal that remains at the location. Thus, for example, the terminal A 104 or terminal B 106 may assume the role of anchor terminal. The terminal assuming the role of anchor terminal may maintain a connection to the structured network 112 so as to enable the remote terminal 114 to continue to participate in the community. Additionally, the anchor terminal 102 may continue to participate in the community remotely via the structured network 112 by communicating with the terminal that assumes the role of anchor terminal.

In an instance in which the role of anchor terminal is transferred, a terminal may volunteer to serve as the anchor terminal. Additionally or alternatively, in some example embodiments, terminals participating in the community that remain on location may collectively negotiate which terminal will assume the role of the anchor terminal based on specified criteria. For example, selection of the terminal to assume the role of anchor terminal may be based at least in part on a quality of a connection with the structured network 112 (for example, a terminal having an available and/or higher quality connection to the structured network 112 may be preferred over a terminal that does not have a connection to the structured network 112 or that has a low connection quality). As another example, in an instance in which one or more of the terminals participating in the local community 110 are battery powered, selection of a terminal to assume the role of anchor terminal may be based at least in part on available battery resources. In this regard, for example, a terminal having the greatest available power reserves may be preferred to serve as the anchor terminal in some example embodiments. As another example, in some example embodiments, a terminal having at least a threshold amount of power reserves may be selected to assume the role of anchor terminal.

In some example embodiments, the community participance module 318 that may be associated with the anchor terminal 102 may be configured to facilitate remote participance in the community and/or maintenance of the community after one or more members of the community (for example, terminal A 104, terminal B 106, the anchor terminal 102 itself, and/or the like) have left the location of the community (for example, the location at which the community 110 was formed). For example, using the previous example of a community formed by a group of friends attending a baseball game, the members of the community may disperse subsequent to the conclusion of the baseball game. While the members of the community may no longer be able to communicate using proximity-based communication, the community participation module 318 of some example embodiments may be configured to use a stored community identifier and/or associated community membership information (for example, contact information for members of the community) to enable communications among members of the community even after the baseball game, such as via the structured network 112.

It is possible that in some instances, a member of the community that has left the community may not have traveled a significant distance from the location of the community. In this regard, for example, during the course of mobility, the member may intermittently come within range of the location of the community (for example, within range of the ad hoc proximity-based communication 108). As another example, a member of the community that has left the community may later return to the location of the community while at least one further member of the community is still at the location. As still a further example, the remote terminal 114 may come within the location of the community during the course of mobility. In some example embodiments, the community participance module 318 that may be associated with the anchor terminal 102, may be configured to send information via the structured network 112 to a terminal participating in the community remotely (for example, the remote terminal 114 and/or a terminal(s) that has become remote from the community, such as the terminal A 104, terminal B 106, and/or the like) for enabling the terminal to determine whether it is within range of the location of the community and/or to communicate with one or more members of the community via ad hoc proximity-based communication 108. The information that may be sent to a terminal that is participating in the community remotely may, for example, include an indication of the location of the anchor terminal 102 (for example, coordinates of the anchor terminal 102), radio communication information for communicating with community members via ad hoc proximity-based communication 108 (for example, a channel identifier, a proximity-based communication technology used by the members of the community, and/or the like), and/or other information for facilitating communication with one or more community members via proximity-based communication 108. The community participance module 318 that may be associated with a terminal participating in the community remotely may accordingly use the information to determine whether and when the terminal may locally participate in the community via the ad hoc proximity-based communication 108, such as by detecting whether the terminal is within sufficient range of the location of the community. Additionally or alternatively, a community participance module 318 that may be associated with a terminal participating in the community remotely may use the information to aid a user of the terminal to find the local community, such as by providing an indication of the location of the local community on a display of the terminal, providing navigational directions to the location of the local community, and/or the like.

Figure 4:
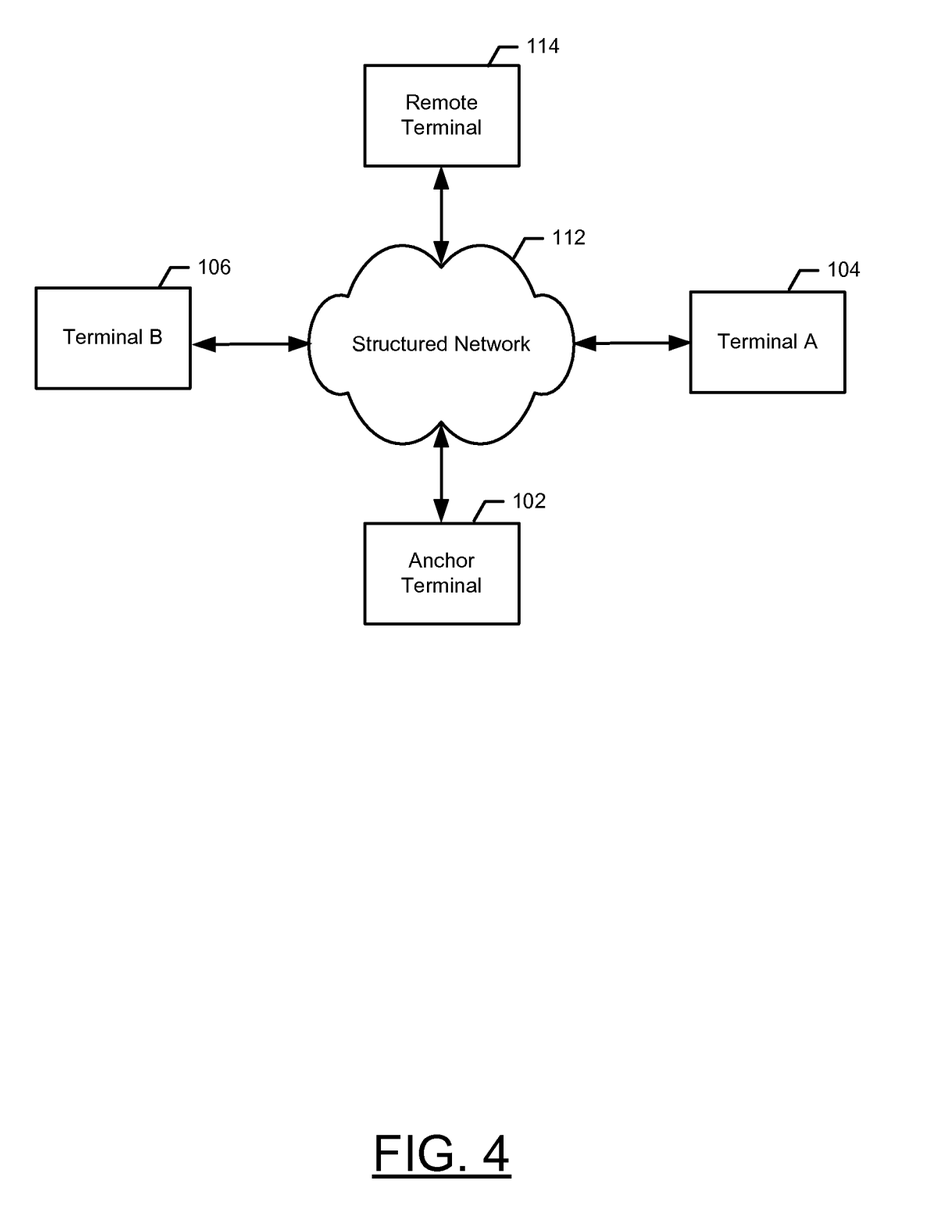
FIG. 4 illustrates an example of maintaining a community according to some example embodiments.

FIG. 4 illustrates an example of maintaining a community according to some example embodiments within the context of the system 100 illustrated in FIG. 1. Referring to FIG. 4, the anchor terminal 102, terminal A 104, terminal B 106, and remote terminal 114 are illustrated as being connected to the structured network 112. In this regard, the anchor terminal 102, terminal A 104, and terminal B 106 may have left the location at which the community 110 illustrated in FIG. 1 was formed, such that they are unable to communicate with each other using proximity-based communication. However, the anchor terminal 102, terminal A 104, and terminal B 106 may have access to the structured network 112. One or more of the anchor terminal 102, terminal A 104, terminal B 106, and remote terminal 114 may use the community identifier for the community and/or membership information for the community to send data to other members of the community. For example, a terminal other than the anchor terminal 102 (for example, the terminal A 104, terminal B 106, or remote terminal 114) may send data over the structured network 112 to the anchor terminal 102 using an address for the anchor terminal 102. The data may be flagged with the community identifier. The community participance module 318 that may be associated with the anchor terminal 102 may be configured to use stored membership information associated with the community identifier to determine contact information for the members of the community (for example, the terminal A 104, terminal B 106, and/or remote terminal 114) and may use the determined contact information to cause the received data to be forwarded from the anchor terminal 102 to one or more further members of the community (for example, the terminal A 104, terminal B 106, and/or remote terminal 114) over the structured network 112.

Figure 5:
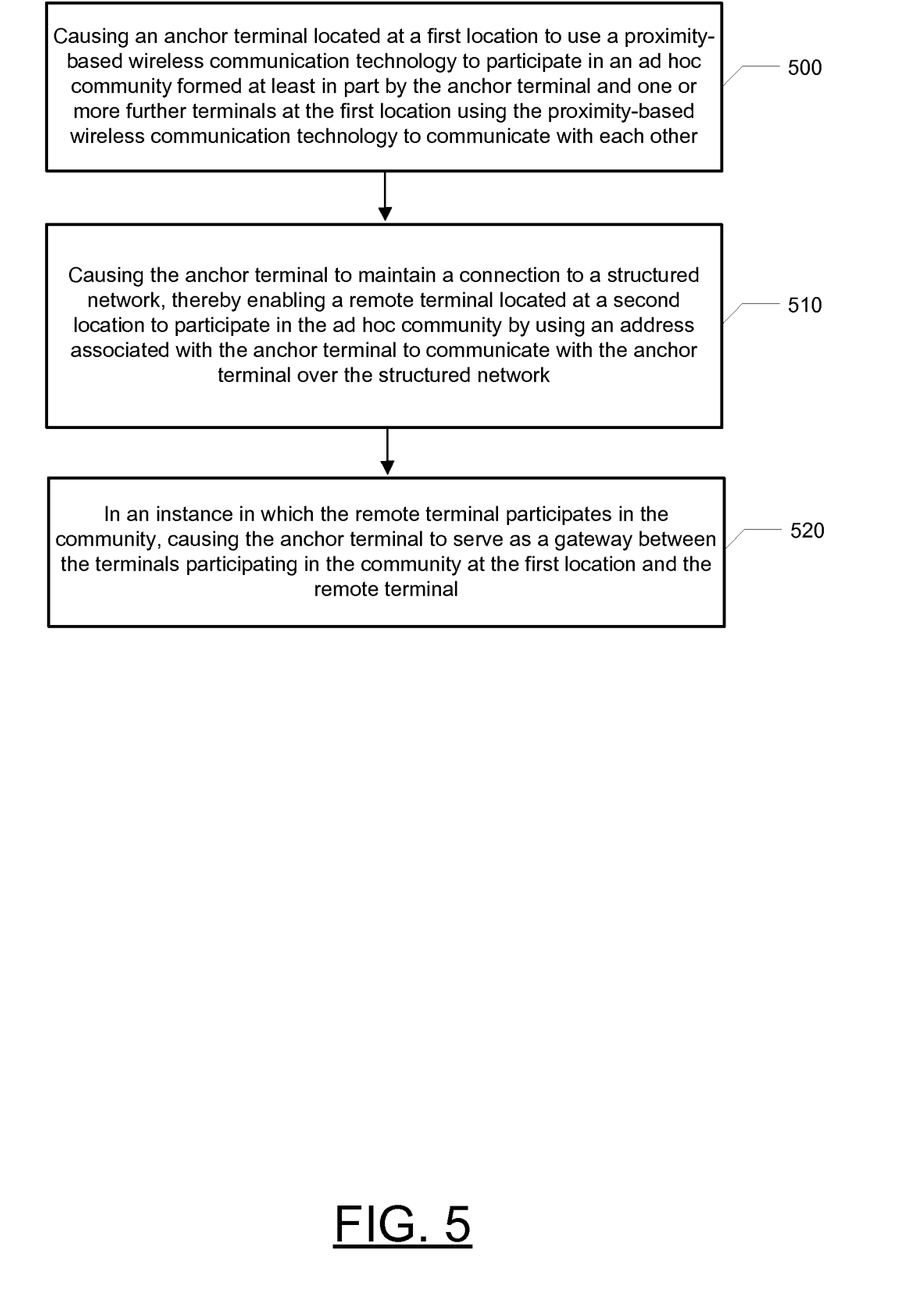
FIG. 5 illustrates a flowchart according to an example method for facilitating remote participance in a community according to some example embodiments.

FIG. 5 illustrates a flowchart according to another example method for facilitating remote participance in a community according to some example embodiments. In this regard, FIG. 5 illustrates operations that may be performed at a terminal apparatus 302 serving as an anchor terminal for a community. The operations illustrated in and described with respect to FIG. 5 may, for example, be performed by, with the assistance of, and/or under the control of one or more of the processor 310, memory 312, communication interface 314, user interface 316, or community participance module 318. Operation 500 may comprise causing an anchor terminal located at a first location to use a proximity-based wireless communication technology to participate in an ad hoc community formed at least in part by the anchor terminal and one or more further terminals at the first location using the proximity-based wireless communication technology to communicate with each other. The processor 310, memory 312, communication interface 314, user interface 316, and/or community participance module 318 may, for example, provide means for performing operation 500. Operation 510 may comprise causing the anchor terminal to maintain a connection to a structured network, thereby enabling a remote terminal located at a second location to participate in the ad hoc community by using an address associated with the anchor terminal to communicate with the anchor terminal over the structured network. The second location may be outside of range of the proximity-based wireless communication technology used by the terminals at the first location to participate in the ad hoc community. The processor 310, memory 312, communication interface 314, user interface 316, and/or community participance module 318 may, for example, provide means for performing operation 510. Operation 520 may comprise, in an instance in which the remote terminal participates in the community, causing the anchor terminal to serve as a gateway between the terminals participating in the community at the first location and the remote terminal. The processor 310, memory 312, communication interface 314, user interface 316, and/or community participance module 318 may, for example, provide means for performing operation 520.

FIG. 5 illustrates a flowchart of a system, method, and computer program product according to some example embodiments. It will be understood that each block of the flowcharts, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 312) and executed by a processor in the computing device (for example, by the processor 310). In some example embodiments, the computer program instructions comprising the computer program product(s) which embody the procedures described above may be stored by memory devices of a plurality of computing devices. As will be appreciated, any such computer program product may be loaded onto a computer or other programmable apparatus (for example, a terminal apparatus 302 and/or other apparatus) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, a terminal apparatus 302 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. According to some example embodiments, a suitably configured processor (for example, the processor 310) may provide all or a portion of the elements. In other example embodiments, all or a portion of the elements may be configured by and operate under control of a computer program product. The computer program product for performing the methods of some example embodiments may include a computer-readable storage medium (for example, the memory 312), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
    causing an anchor terminal located at a first location to use a proximity-based wireless communication technology to participate in an ad hoc community formed at least in part by the anchor terminal and a plurality of further terminals at the first location using the proximity-based wireless communication technology to communicate with each other;
    causing the anchor terminal selected based at least in part on available battery resources to maintain a connection to a structured network, thereby enabling a remote terminal located at a second location that is outside of range of the proximity-based wireless communication technology used by the terminals at the first location to participate in the ad hoc community by using an address associated with the anchor terminal to communicate with the anchor terminal over the structured network, wherein the structured network comprises a wireless local area network; and
    maintaining, at the anchor terminal, membership information for the community, the membership information comprising contact information, associated with multiple terminals that are members of the community, to enable communication among the members of the community after at least one member of the community has left the first location at which the community was formed via the structured network, and to enable association with the remote terminal in the community and utilize the membership information to locate the community by providing to the remote terminal with navigation direction to the first location of the community, wherein in an instance in which the remote terminal participates in the community, the method further comprises causing the anchor terminal to use the membership information to serve as a gateway between the terminals participating in the community at the first location and the remote terminal.

2. The method of claim 1, wherein causing the anchor terminal to serve as a gateway comprises causing data exchanged between terminals participating in the community at the first location to be forwarded toward the remote terminal via the structured network.

3. The method of claim 1, wherein causing the anchor terminal to serve as a gateway comprises:
receiving, at the anchor terminal, data sent to the community by the remote terminal via the structured network; and
causing the data sent to the community by the remote terminal to be forwarded to at least one further terminal participating in the community at the first location via the proximity-based wireless communication technology.

4. The method of claim 1, wherein the community is identified by a community identifier, and wherein the community identifier is usable to enable the remote terminal to participate in the community.

5. The method of claim 1, wherein the membership information is maintained in association with a community identifier for the community, and wherein the community identifier is usable to enable members of the community to send data to other members of the community.

6. The method of claim 1, wherein the contact information comprises at least one of a phone number, an international mobile subscriber identity, an email address, an internet protocol address, a domain service name, and a universal resource identifier.

7. The method of claim 1, further comprising, subsequent to at least one of the terminals at the first location leaving the first location, facilitating, by the anchor terminal via the structured network, communication between the at least one terminal that has left the first location and one or more further members of the community.

8. The method of claim 7, wherein facilitating communication between the terminal that has left the first location and one or more further members of the community comprises:
receiving, at the anchor terminal via the structured network, data sent to the community using a community identifier for the community; and
using the stored membership information associated with the community identifier to cause the received data to be forwarded from the anchor terminal to one or more other members of the community.

9. The method of claim 2, wherein in an instance in which data exchanged between members of the community comprises data associated with one or more of a file size or type satisfying a threshold size or type, causing the anchor terminal to serve as a gateway between the terminals participating in the community at the first location and the remote terminal comprises causing a link to a network-accessible file containing the data to be exchanged between the terminals participating in the community at the first location and the remote terminal.

10. The method of claim 1, wherein the structured network further comprises one or more of a cellular network or the internet.

11. An apparatus comprising at least one processor and at least one memory storing computer program code, wherein the at least one memory and stored computer program code are configured, with the at least one processor, to at least:
cause the apparatus located at a first location to use a proximity-based wireless communication technology to participate in an ad hoc community formed at least in part by the apparatus and a plurality of further terminals at the first location using the proximity-based wireless communication technology to communicate with each other;
cause the apparatus selected to serve as an anchor terminal based at least in part on available battery resources to maintain a connection to a structured network, thereby enabling a remote terminal located at a second location that is outside of range of the proximity-based wireless communication technology used by the terminals at the first location to participate in the ad hoc community by using an address associated with the apparatus to communicate with the apparatus over the structured network, wherein the structured network comprises a wireless local area network; and
cause the apparatus to maintain membership information for the community at the apparatus, the membership information comprising contact information, associated with multiple terminals that are members of the community, to enable communication among the members of the community after at least one member of the community has left the first location at which the community was formed via the structured network, and to enable association with the remote terminal in the community and utilize the membership information to locate the community by providing to the remote terminal with navigation direction to the first location of the community,
wherein in an instance in which the remote terminal participates in the community, the at least one memory and stored computer program code are configured, with the at least one processor, to further cause the apparatus to use the membership information to serve as a gateway between the terminals participating in the community at the first location and the remote terminal.

12. The apparatus of claim 11, wherein the at least one memory and stored computer program code are configured, with the at least one processor, to further cause the apparatus to serve as a gateway at least in part by causing data exchanged between terminals participating in the community at the first location to be forwarded toward the remote terminal via the structured network.

13. The apparatus of claim 11, wherein the at least one memory and stored computer program code are configured, with the at least one processor, to further cause the apparatus to serve as a gateway at least in part by:
receiving, at the apparatus, data sent to the community by the remote terminal via the structured network; and
causing the data sent to the community by the remote terminal to be forwarded to at least one further terminal participating in the community at the first location via the proximity-based wireless communication technology.

14. The apparatus of claim 11, wherein the community is identified by a community identifier, and wherein the community identifier is usable to enable the remote terminal to participate in the community.

15. The apparatus of claim 11, wherein the membership information is maintained in association with a community identifier for the community, and wherein the community identifier is usable to enable members of the community to send data to other members of the community.

16. The apparatus of claim 11, wherein the contact information comprises at least one of a phone number, an international mobile subscriber identity, an email address, an internet protocol address, a domain service name, and a universal resource identifier.

17. The apparatus of claim 11, wherein the at least one memory and stored computer program code are configured, with the at least one processor, to further cause the apparatus, subsequent to at least one of the terminals at the first location leaving the first location, to facilitate, by the apparatus via the structured network, communication between the at least one terminal that has left the first location and one or more further members of the community.

18. The apparatus of claim 17, wherein the at least one memory and stored computer program code are configured, with the at least one processor, to further cause the apparatus to facilitate communication between the terminal that has left the first location and one or more further members of the community at least in part:

receiving, at the apparatus via the structured network, data sent to the community using a community identifier for the community; and using the stored membership information associated with the community identifier to cause the received data to be forwarded from the apparatus to one or more other members of the community.

19. The apparatus of claim 12, wherein in an instance in which data exchanged between members of the community comprises data associated with one or more of a file size or type satisfying a threshold size or type, the at least one memory and stored computer program code are configured, with the at least one processor, to further cause the apparatus to serve as a gateway between the terminals participating in the community at the first location and the remote terminal by causing a link to a network-accessible file containing the data to be exchanged between the terminals participating in the community at the first location and the remote terminal.

20. The apparatus of claim 11, wherein the structured network further comprises one or more of a cellular network or the internet.

\* \* \* \* \*